J. L. Booth.
BEST AVAILABLE COPY
Railroad Track Iron.
No. 3,473. Reissued Jun. 1, 1869.
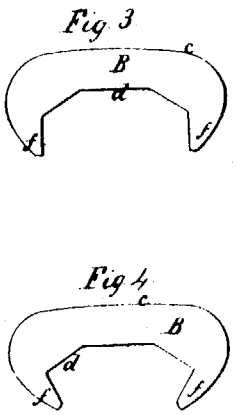
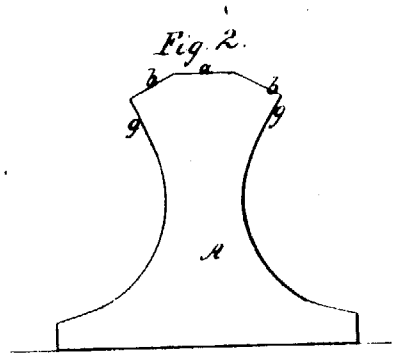
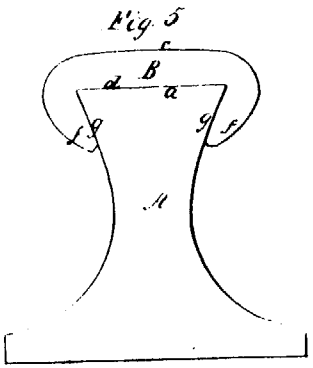
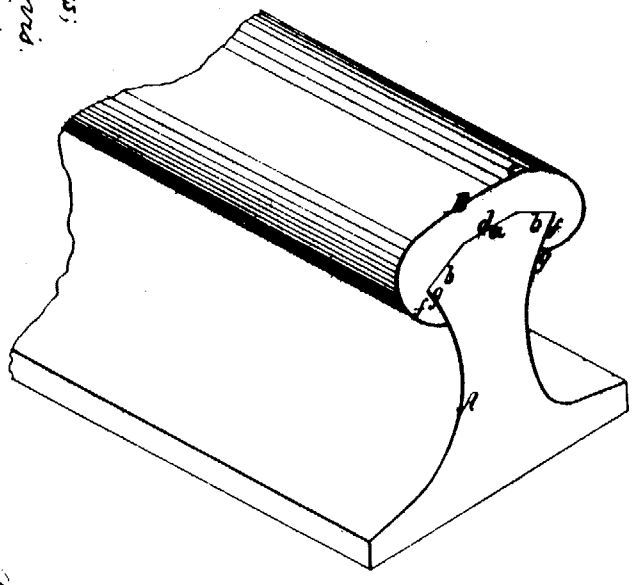
Witnesses;
J. A. Davis.
R. F. Agord.
Inventor,
Jonathan L. Booth
H. PETERS, PHOTO-LITHOGRAPHER, WASHINGTON, D. C.

United States Patent Office.

BEST AVAILABLE COPY

J. L. BOOTH, OF ROCHESTER, NEW YORK.

*Letters Patent No.* 57,467, *dated August* 28, 1866; *reissue No.* 3,473, *dated June* 1, 1869.

IMPROVEMENT IN RAILROAD-RAILS.

The Schedule referred to in these Letters Patent and making part of the same.

*To all whom it may concern:*

Be it known that I, J. L. BOOTH, of Rochester, in the county of Monroe, and State of New York, did invent a certain new and useful Improvement in Railroad-Rails; and I do hereby declare that the following is a full and exact description thereof, reference being had to the accompanying drawings, making part of this specification.

Figure 1 is a perspective view of a section of rail, constructed in my improved manner.

Figure 2, an end elevation of the body of the rail.

Figures 3 and 4, views of the cap in the several stages of rolling.

Figure 5, a view showing a modified form of the rail.

Like letters of reference indicate corresponding parts in all the figures.

Many attempts have been made to construct a rail with an inferior base, and superior cap or tread, which can be replaced when worn out, without discarding the base.

One plan has been to use a steel face, welded to an iron base or body, and rolled with it. The great objection to this, is that when the superior face is worn out, the whole rail must be discarded as useless, as the steel and iron cannot be separated.

Another plan has been to employ a loose face or cap, sliding endwise on the base, and secured by bolts so as to be removable. The difficulty in this case is that the parts are loose and rattling, are easily broken, and do not form, as it were, an integral whole.

My invention consists in combining the cap with the base, by rolling the two parts together, after being separately formed, so as to have a natural adhesion, which holds as firmly in place, under action, as the natural rail, but is still easily torn apart and replaced when worn, whereby the same base is made available for continued use.

In the drawings—

A indicates the body or base, and

B represents the cap which is applied thereto.

The top or bearing-surface of the body of the rail may be formed with several angular planes, *a b b*, as shown in figs. 1 and 2, or with a single one, as in fig. 5; or with a convex one, or any other that will answer the same purpose.

The cap is first passed through rollers, so as to make it of suitable form to correspond with the contact-surface, over which it fits, as shown in fig. 3.

At this stage, the lips *f f*, which strike under the wedging sides *g g*, of the base, to hold the parts in place, stand vertically, as otherwise the cap cannot be placed flat over the base, preparatory to being rolled thereto.

In this condition, the cap is applied to the top of the base, and the whole is passed between suitable rollers, which act upon the lips *f f*, and set them in firmly against the angles *g g*, and thus bind the parts closely together.

The cap is preferably, but not necessarily, applied hot, in which case the natural shrinkage assists in holding the parts together.

By this process of rolling the cap firmly in contact with the base, and setting the lips *f* under the angles *g*, I combine the parts so firmly as to form a unit or whole, by the natural adhesion or contact of the metal, so that they cannot become displaced under any action to which they are subjected, but at the same time, where worn, the cap can be torn off by artificial means, and the base, which is uninjured, can be used again and again.

The advantages of this arrangement over those at first mentioned are obvious.

When the tread is welded to the base, the whole rail must be thrown away when the thread is torn out. And when the cap is combined with the base loosely by sliding on, the rail is practically useless, owing to the irregular play of the tread and frequent breakage and disarrangement, as has been abundantly proved in practice.

By employing a separate and independent cap, rolled closely to the base, so as to adhere thereto, I form a unit of the rail, and avoid all these difficulties.

Besides the above advantages, there are others, as follows:

If either the base or cap should break, and the other part remain entire, the rail would remain intact, by reason of the closeness and tenacity with which they hold together; and as they are distinct and independent parts, it is not probable they would break in the same place.

If a rail with a welded cap or face were to break, it would break at one place; and if a combined rail, loosely connected, were to break, the parts would be likely to become separated and detached, or at least so disarranged as to throw a train from the track.

The ends of the rail may be hardened to prevent abrasion of the joints.

I do not claim simply and broadly combining a cap or tread with a base or body, as the same has been done by welding or rolling in one mass, and also by slipping loosely one over the other.

Still another plan is to form a shoulder on each side of the rail, located below the broadest portion of the head, and extending the whole length of it; then to apply, upon and around the head of said rail, a steel cap of such dimensions, that when folded around the head, its edges hugging the head of the rail, will rest upon its shoulders.

My invention is an improvement of the last-named method of construction, and consists in dispensing with

BEST AVAILABLE COPY the shoulders on the sides of the rail, by virtue of which the steel-cap, as it becomes flattened and extended by the action of the trains passing over it, is left free to extend itself downward on each side of the rail, and thus at all times permit to the cap a firm and solid bearing upon the top surface of the rail, a condition impossible with the shouldered rail above described.

What I claim as my invention, and desire to secure by Letters Patent, is—

The construction of steel-capped rails, substantially as herein described and shown.

In witness whereof, I have hereunto signed my name in the presence of two subscribing witnesses.

J. L. BOOTH.

Witnesses:
R. F. OSGOOD,
J. R. DRAKE.